(12) United States Patent
Inoue

(10) Patent No.: US 7,804,610 B2
(45) Date of Patent: Sep. 28, 2010

(54) IMAGE FORMING APPARATUS, IMAGE FORMING METHOD AND COMPUTER READABLE MEDIA

(75) Inventor: Akira Inoue, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 1189 days.

(21) Appl. No.: 11/238,002

(22) Filed: Sep. 28, 2005

(65) Prior Publication Data

US 2007/0002369 A1 Jan. 4, 2007

(30) Foreign Application Priority Data

Jun. 30, 2005 (JP) .............................. 2005-191920

(51) Int. Cl.
*G06F 3/12* (2006.01)
*G06F 15/00* (2006.01)
*H04N 1/60* (2006.01)
(52) U.S. Cl. .................... 358/1.15; 358/1.1; 358/1.9
(58) Field of Classification Search ................. 358/1.1, 358/1.9, 1.11–1.18
See application file for complete search history.

(56) References Cited

U.S. PATENT DOCUMENTS 6,108,099 A * 8/2000 Ohtani ...................... 358/1.15

2004/0098410 A1 * 5/2004 Ozawa ...................... 707/104.1

FOREIGN PATENT DOCUMENTS

| JP | 2004-348194 | | 12/2004 |
| JP | 2004-348423 | | 12/2004 |
| JP | 2004-348431 | | 12/2004 |
| JP | 2004-348498 | | 12/2004 |
| JP | 2004-348622 A | | 12/2004 |
| JP | 2005-50074 A | | 2/2005 |
| JP | 2005050074 A | * | 2/2005 |

OTHER PUBLICATIONS

Japanese Office Action for Japanese Patent Application No. 2005-191920 mailed Feb. 17, 2009 with English Translation.

* cited by examiner

*Primary Examiner*—Thierry L Pham
(74) *Attorney, Agent, or Firm*—Cantor Colburn LLP

(57) ABSTRACT

An embodiment may comprise an image forming apparatus comprising: a receiving section which receives a print data; storage which stores the received print data; a print data judging section which judges whether the received print data is a structured document data or not; a controlling section which operates the receiving part preferentially when it is judged that the print data is a structured document data, compared to a case that the print data is a non-structured document data; an image converting section which converts the stored print data to image data; and a printing section which prints the image data to a predetermined recording medium.

7 Claims, 6 Drawing Sheets

FIG.6

```
%PDF-1.3
```
} HEADER PART

```
1 0 obj
<<
/Type /Catalog
/Pages 3 0 R
/Outlines 4 0 R
>>
endobj
2 0 obj
<<
/Type /XObject
/Subtype /Image
/Name /Im0
/Width 4800
/Height 10 0 R
/BitsPerComponent 1
/ColorSpace /DeviceGray
/Filter /CCITTFaxDecode
/DecodeParam << /K - 1 /Columns 4800 >>
/Length 11 0 R
>>
stream
        Data
endobj
```
} ACTUAL DATA PART

```
xref
0 13
0000000000 65535 f
0000005786 00000 n
trailer
<<
/Size 13
/Root 1 0 R
/Info 2 0 R
>>
startxref
6244
%%EOF
```
} DOCUMENT STRUCTURE PART

IMAGE FORMING APPARATUS, IMAGE FORMING METHOD AND COMPUTER READABLE MEDIA

CROSS REFERENCE TO RELATED APPLICATION

This application is based on Japanese Patent Application No. 2005-191920 filed on Jun. 30, 2005, in Japanese Patent Office, the entire content of which is hereby incorporated by reference.

BACKGROUND OF THE INVENTION

1. Field of the Invention

The present invention relates to an image forming apparatus, image forming method and program, especially relates to an image forming apparatus, image forming method and program which receives a structured document data such as PDF data and forming an image.

2. Description of Related Art

So far, a network type printer has become common, which prints a print data stored in a computer such as a PC through a network such as a LAN. In this case, generally, print data is sent after a printer driver installed to a computer converts the print data to one prescribed in a page description language which the printer can analyze such as POSTSCRIPT®. The printer performs a series of the image forming process in round-robin fashion which is to alternate receiving the converted print data and executing the other process such as image processing for the received print data at predetermined interval.

On the other hand, a structured document data such as PDF (portable document format) has become common as a print data distributed on the Internet, in which the original document can be reconstructed from the structured document data independently from a type of OS (operation system) and application. In particular, PDF data includes an object to draw a part or all of a content of a certain page of a document. The objects may be arranged in a file independently from the sequence thereof displayed in the document. A structure of the document is analyzed by referring to location information of the object in a file, information about the object included in a content of each page, and the like. In recent years, a printer which can directly print PDF data sent from a PC or the like without converting it to print data (hereinafter referred to as a direct print) has become common along with dissemination of such PDF data.

The above-described PDF data records a document structure information designating a location of objects constituting each page of the document at the end part of the PDF data. Here, a data structure of a PDF data is described with reference to FIG. 6. A PDF data is composed of a header part including data attribute of the PDF data, an actual data part including data to be printed, and a document structure part including document structure information of the PDF data. Generally, when PDF data is sent, the header part, actual data part and document structure part is sent in that order. Thus, a printer cannot start printing before the printer receives whole parts of the PDF data.

Therefore, it has been proposed that PDF data is divided into at least three data blocks, and the PDF data is sent to a printer sequentially from the divided last data blocks (see JP 2004-348194A, JP 2004-348423A and JP 2004-348431A, hereinafter also referred to as patent document 1, 2 and 3 respectively). Further, it has been proposed that PDF data is edited and reconstructed so as to be new PDF data of each page and the reconstructed PDF data is sent to a printer (JP 2004-348498A, hereinafter referred to as patent document 4).

However, in above-described patent documents 1 to 4, a host apparatus to send PDF data to a printer such as a PC requires a member to process the PDF data, and also the printer requires a member to deal the processed PDF data. Thus, it has been problematic that the host apparatus and the printer have increased loads.

SUMMARY

The present invention was made in the light of the above problems. The present invention may provide an image forming apparatus, image forming method and program which can rapidly and effectively print a structured document data including document structure information at the end part thereof.

In order to achieve at least one of the above mentioned features, according to one embodiment reflecting the first aspect of the invention, an image forming apparatus comprises:

a receiving section which receives a print data;

a storage which stores the received print data;

a print data judging section which judges whether the received print data is a structured document data or not;

a controlling section which operates the receiving part preferentially when it is judged that the print data is a structured document data, compared to a case that the print data is a non-structured document data;

an image converting section which converts the stored print data to image data; and a printing section which prints the image data to a predetermined recording medium.

Preferably, when the print data judging section judges that the print data is structured document data, the controlling section performs a process to receive the structured document data in preference to the other process.

Preferably, the image forming apparatus further comprises a condition detecting section which detects a condition of the image forming apparatus, wherein the controlling section performs the process to receive the structured document data in preference to the other process based on a detection results detected by the condition detecting section.

Preferably, the print data judging section judges whether the print data is structured document data or not, based on information included in a header part of the print data.

Preferably, document structure information designating data structure to be printed is included in an end part of the structured document data.

Preferably, the structured document data is composed in a format of PDF format.

In order to achieve at least one of the above mentioned features, according to one embodiment reflecting the second aspect of the invention, an image forming method comprises:

receiving a print data;

storing the received print data;

judging whether the received print data is structured document data or not;

performing the receiving preferentially when it is judged that the print data is structured document data, compared to a case that the print data is non-structured data;

converting the stored print data to image data; and printing the image data to a predetermined recording medium.

In order to achieve at least one of the above, according to one embodiment reflecting the third aspect of the invention, a computer executable program causes a computer to carry out the functions of:

receiving a print data;

storing the received print data;

judging whether the received print data is structured document data or not;

performing the receiving preferentially when it is judged that the print data is structured document data, compared to a case that the print data is non-structured data;

converting the stored print data to image data; and printing the image data to a predetermined recording medium.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which advantages and features of the present invention will become more fully understood from the detailed description given hereinbelow and the appended drawings, and thus are not intended as a definition of the limits of the present invention, and wherein;

FIG. 6 is a view showing an example of a data structure of PDF data.

PREFERRED EMBODIMENT OF THE INVENTION

Hereinafter, a best mode for carrying out at least an embodiment of the present invention will be described in detail with reference to the drawings. It is not intended that the illustrated examples limit the scope of the present invention.

First Embodiment

Figure 1:
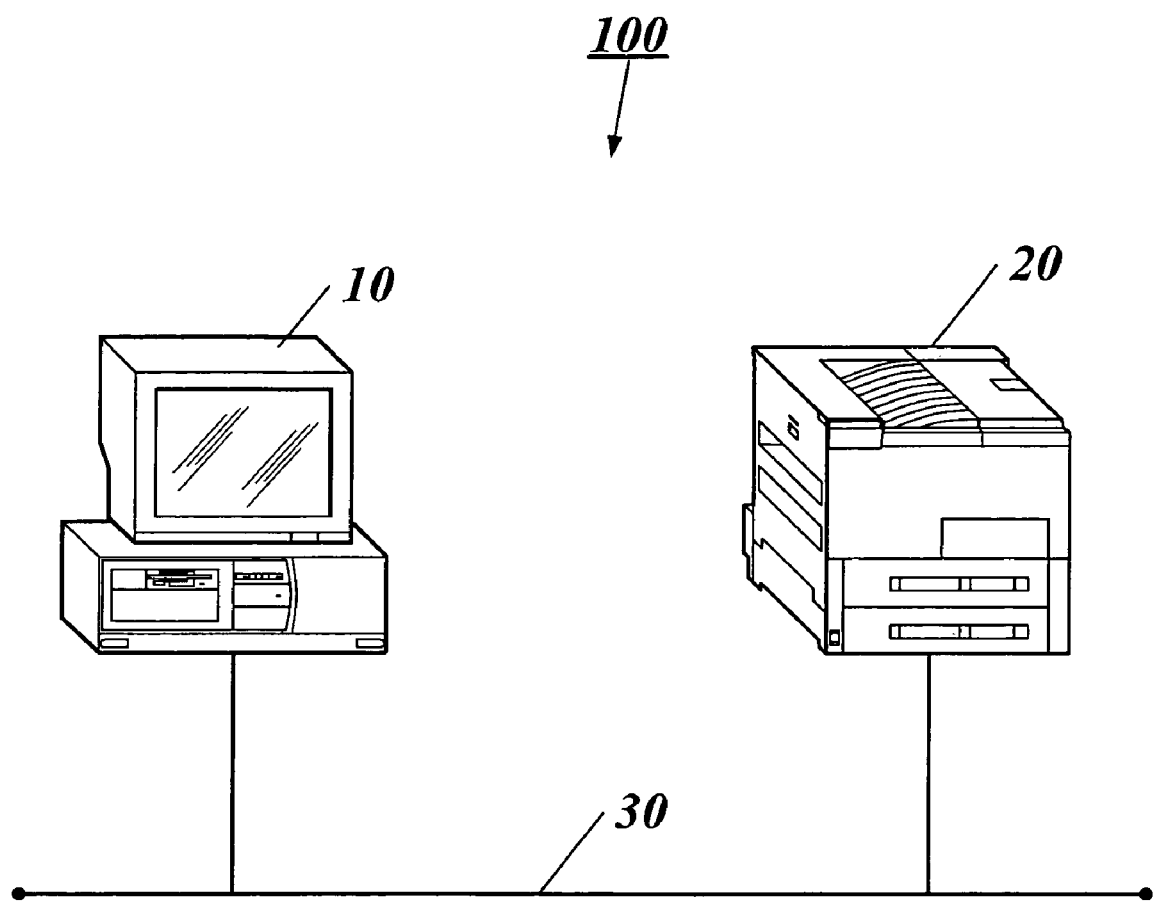
FIG. 1 is a view showing a whole constitution of an image processing system.

FIG. 1 is a view showing a whole constitution of an image processing system 100 where an image forming apparatus of the invention is applied. As shown in FIG. 1, the image processing system 100 of the invention comprises a printer 20 as an image forming apparatus, a personal computer 10 as an image processor, in which they are connected with each other through a network 30 so as to communicate with each other. The number and kind of equipments connected to the network 30 is not limited to the example shown in FIG. 1. Further, the printer 20 may be directly connected with the personal computer 10 without the network 30 (local connection).

The personal computer 10 comprises a CPU, a ROM, a RAM, a hard disk to store various programs and data, a display to display various screens, an input member to accept various inputs such as a keyboard and mouse, a network interface or the like, in which they are connected with each other through a bus. As described later, software specific for executing PDF direct print as well as a printer driver to execute normal print is installed to the hard disk of the personal computer 10.

The printer 20 receives a print data sent from the personal computer 10, forms image data for printing based on the received print data, and records, i.e. prints, the image data to a predetermined recording medium such as a print paper. The printer 20 will hereinafter be described in detail.

The network 30 comprises a LAN in which a computer and network or the like are connected with each other under a standard such as ETHERNET®, token ring and FDDI, and a WAN in which LANs are connected with each other, and the like.

The image processing system 100 of an embodiment uses a predetermined protocol as a data communication protocol between the personal computer 10 and printer 20, which allows two-way communication, can establish a session once each job and can send a data at optional part of a file. For example, various protocols such as Raw (TCP/IP 9100), LPR (line printer remote), IPP (Internet printing protocol) and the like can be given. An original protocol may also be used.

The image processing system 100 of an embodiment may perform two types of printing, which are normal print and PDF direct print. When the normal print is performed, the personal computer 10 converts a file to be printed to a print data described in a page description language such as PDL and then sends it to the printer 20. On the other hand, when the PDF direct print is performed, the specific software of the personal computer 10 sends PDF data to be printed from the personal computer 10 to the printer 20 without converting it to print data at the personal computer 10.

Hereinafter, the printer 20 will be described with reference to FIG. 2.

Figure 2:
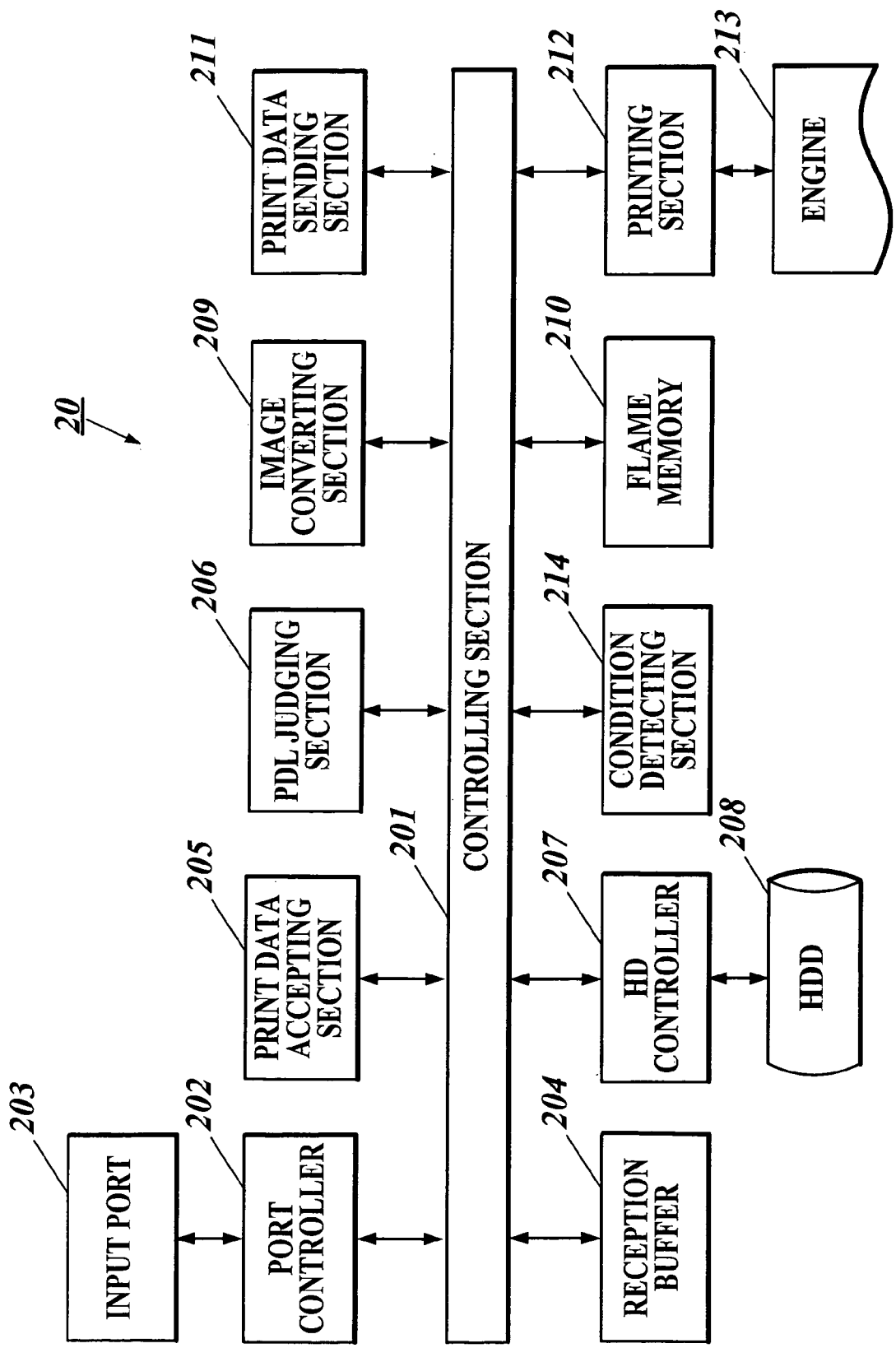
FIG. 2 is a block diagram showing a constitution of a printer.

FIG. 2 is a block diagram to show a constitution of the printer 20 of the present embodiment. In FIG. 2, the printer 20 comprises a controlling section 201, an input port 203, a port controller 202, a reception buffer 204, a print data accepting section 205, a PDF judging section 206, a HD controller 207, a HDD 208, an image converting section 209, a frame memory 210 a print data sending section 211, a printing section 212, an engine 213 and a condition detecting section 214.

The controlling section 201 comprises a CPU (central processing unit), a ROM (read only memory), a RAM (random access memory) and the like, which are not shown. The CPU executes various control programs presciently stored in the ROM so as to control operations of various sections constituting the printer 20 integrally.

Under control of the controlling section 201, a port controller 202 controls communication of information with the other equipments connected to the network 30 through the input port 203 composed of a modem (modulator/demodulator), a terminal adapter, a LAN adapter and the like. Specifically, the port controller 202 receives component data of the print data sent from the personal computer 10, and stores them to the reception buffer 204. The reception buffer 204 is a storage composed of a rewritable recording medium such as a RAM and flash memory.

The print data accepting section 205 checks a condition of the reception buffer 204 under control of the controlling section 201. When the reception buffer 204 temporally stores the component data of the print data, the print data accepting section 205 reads out the component data and outputs it to the PDL judging section 206.

Under control of the controlling section 201, the PDL judging section 206 judges whether the print data composed of the component data is PDF data or not, based on a header part of the component data input from the print data accepting section 205, and outputs a result of the judgment to the controlling section 201. When the PDL judging section 206 judges that the print data is PDF data, the controlling section 201 makes the HDD 208 store the component data of the print (PDF) data temporally stored in the reception buffer 204 by the HD controller 207. When one PDF data is completely stored, the controlling section 201 makes the image conversion processing section 209 process the PDF data. When it is judged that the print data is a non-structured document, the controlling section 201 makes the image conversion processing section 209 process this print data.

The HD controller 207 stores a program, data and the like in the HDD 208 under control of the controlling section 201. Specifically, when an order to store the component data of the PDF data temporally stored in the reception buffer 204 is input from the controlling section 201, the HD controller stores the component data in a predetermined storage area of the HDD 208. When an order to read out the stored PDF data is input from the controlling section 201, the HD controller reads out the designated PDF data from the HDD 208 and outputs it to the controlling section 201. The HDD 208 is composed of a hard disk drive in an embodiment. However, the HDD 207 is not limited thereto and may be composed of a rewritable recording medium such as a RAM and flash memory.

Under control of the controlling section 201, the image converting section 209 analyzes the PDL data included in the component data of the print data temporally stored in the reception buffer 204, and forms image data (bitmap data) of each page. Further, the image converting section 209 analyzes document structure information of the PDF data stored in the HDD 208, and forms an image data of each page. Then, every time the image data is formed, the image converting section 209 stores the image data of each page in the frame memory 210. The frame memory 210 is a storage area composed of a rewritable recording medium such as a RAM and flash memory.

Under control of the controlling section 201, the print data sending section 211 checks a condition of the frame memory 210. When the frame memory 210 stores the image data of one page, the print data sending section 201 sends this image data to the printing section 212. The printing section 212 outputs the input image data to the engine, so as to print the image data to a predetermined recording medium such as paper. Further, the printing section 212 detects a condition of the engine, and outputs the result of the detection to the controlling section 201.

The condition detecting section 214 detects conditions of each section of the printer 20 and outputs the result of the detection to the controlling section 201.

Figure 3:
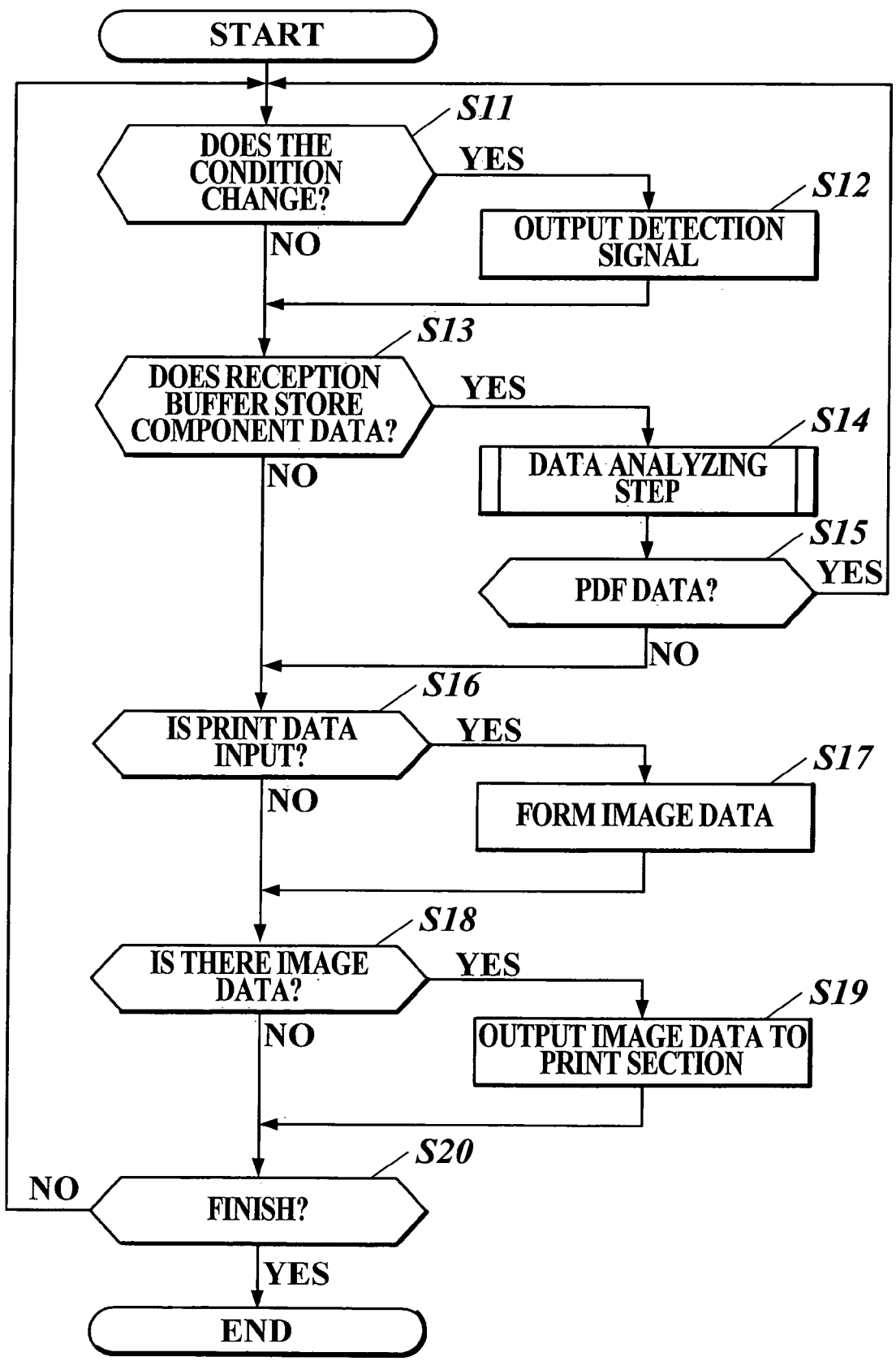
FIG. 3 is a flowchart showing an image forming process of the first embodiment.
Figure 4:
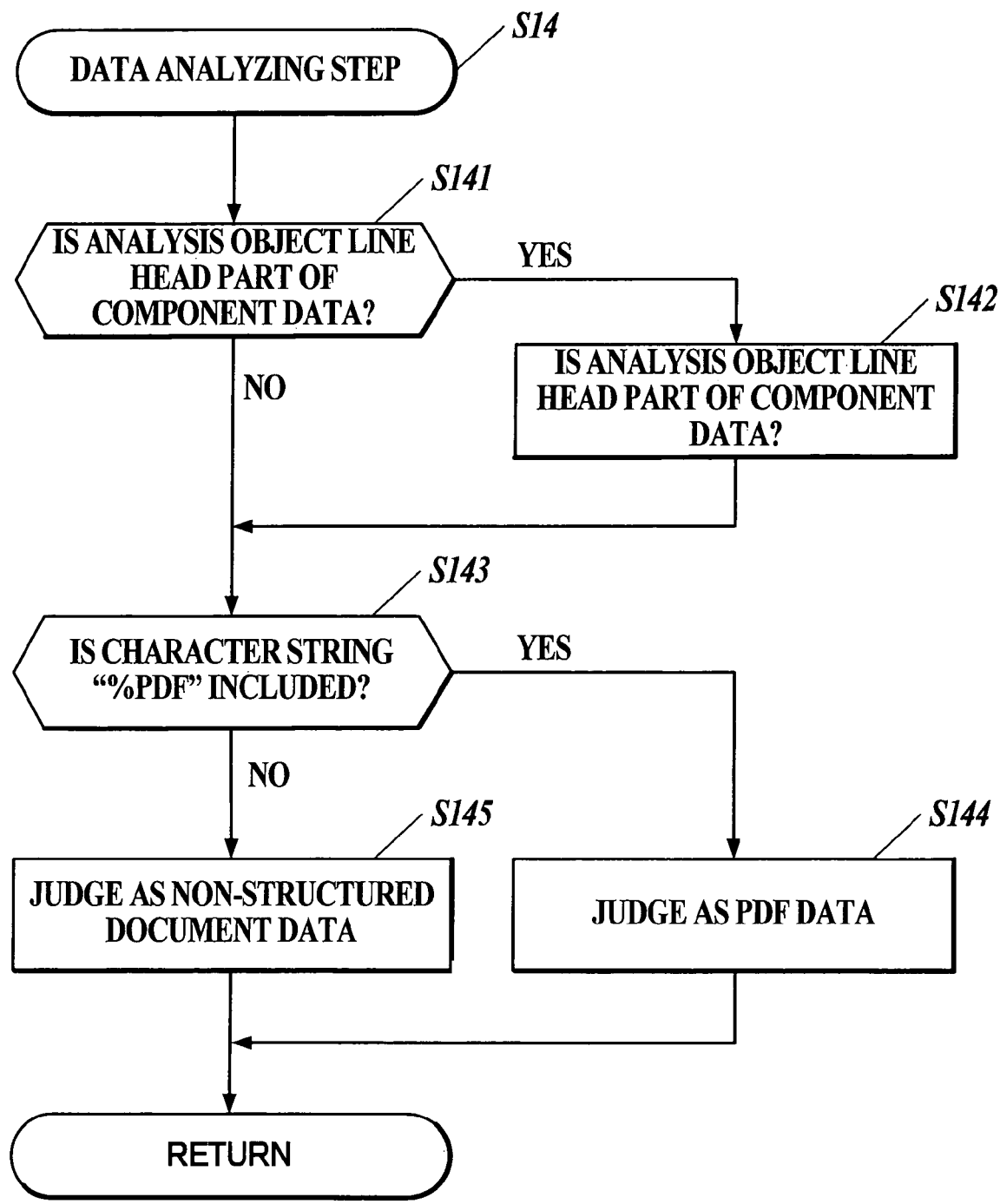
FIG. 4 is a flowchart showing a data analyzing process of the first embodiment.

Next, an outline of the operation of the image processing system 100 of the embodiment will be described. FIGS. 3 and 4 are flowcharts showing a series of steps in the image forming process of the printer 20 of the embodiment. Each step shown in FIGS. 3 and 4 shows a process executed in round-robin fashion under control of the controlling section 201.

In FIG. 3, the printing section and condition detecting section check the condition of each section of the printer (step S11). When a change of the condition is detected in any one of the sections (step S11; No), a detection signal to inform the changed section and the condition thereof is output to the controlling section 201 (step S12), and the process shifts to step S13. When a change of the condition is not detected in any sections, the process shifts to step S13 directly.

In step S13, the print data accepting section 205 judges whether the reception buffer 204 stores the component data of the print data or not. When it is judged that the component data is not stored (step S13; No), the process shifts to step S16. When it is judged that the component data is stored (step S13; Yes), the process shifts to a data analyzing step of step S14.

Hereinafter, the data analyzing step of step S14 will be explained with reference to FIG. 4. This step is executed by the PDL judging section 208 under condition of the controlling section 201.

Firstly, it is judged whether analyze object in the component data input from the print data accepting section 205 is a line head part of the print data, or not (step S141). When it is judged that the analyze object is not a line head part (step S141; No), a line head part in the component data is searched and the found line head part is set as the analyze object (step S142), and the process shifts to step S143. In step S141, when it is judged that the analyze object is a line head part of the print data (step S141; Yes), the process shifts to step S143 directly.

In step S143, data included in the line head part is analyzed and it is judged whether it includes a character string "%PDF", or not (step S143). When it is judged that the character string "%PDF" is not included (step S143; No), the component data is judged as a non-structured document (step S144), and the process shifts to step S15 of FIG. 3. When it is judged in step S143 that the character string "%PDF" is included (step S143; Yes), the component data is judged as PDF data (step S145), and the process shifts to step S15.

Back to FIG. 3, when it is judged based on the analysis result of step S14 that the component data stored in the reception buffer 204 is component data constituting PDF data (step S14; Yes), the component data is stored to the HDD 210 (step S15) and the process returns to step S11. When it is judged in step S14 that the data is a non-structured document (step S14; No), the process shifts to step S16.

In step S16, the image converting section 209 judges whether print data has been input or not. When it is judged that print data has not been input (step S16; No), the process shifts to step S18 directly. When it is judged in step S16 that print data has been input (step S16; Yes), the input print data is analyzed and image data is formed (step S17), and the process shifts to step S18.

Next, in step S18, it is judged whether the frame memory 210 stores image data corresponding to one page by means of the print data sending section 211, or not. When it is judged that image data corresponding to one page is not stored (step S18; No), the process shifts to step S20 directly. When it is judged in step S18 that image data corresponding to one page is stored (step S18; Yes), the image data stored in the frame memory 210 by means of the print data sending section 211 is output to the printing section (step S19), the image are formed on a predetermined recording medium, and the process shifts to step S20.

In step S20, it is judged whether the image forming process is finished or not. When a terminate direction to terminate the process is input from the personal computer 10 or the printer 20, (step S20; Yes), the process is finished. When the direction to terminate the process is not input (step S20; No), the process returns to step S11 so that the process continues.

As described above, the printer 20 of the first embodiment is successful in shorten the time to receive PDF data, since the port controller 202 and input port 203 works preferentially compared to the case of receiving non-PDF data, when it is judged that the print data is PDF data. Thus, it becomes possible to print PDF data including document structure information at the end part thereof quickly and effectively.

Further, when it is judged that the print data is PDF data, the step which relates to receiving the PDF data is performed preferentially. Thus, it becomes possible to shorten the time to receive PDF data, and to print PDF data including document structure information at the end part thereof quickly and effectively.

Second Embodiment

Next, a second embodiment will be described. A printer 20 of the present embodiment has similar constitution with that of the above-described first embodiment (see FIG. 2), in which the printer 20 is connected with a personal computer 10 through a network 30 so as to communicate with each other (see FIG. 1).

Figure 5:
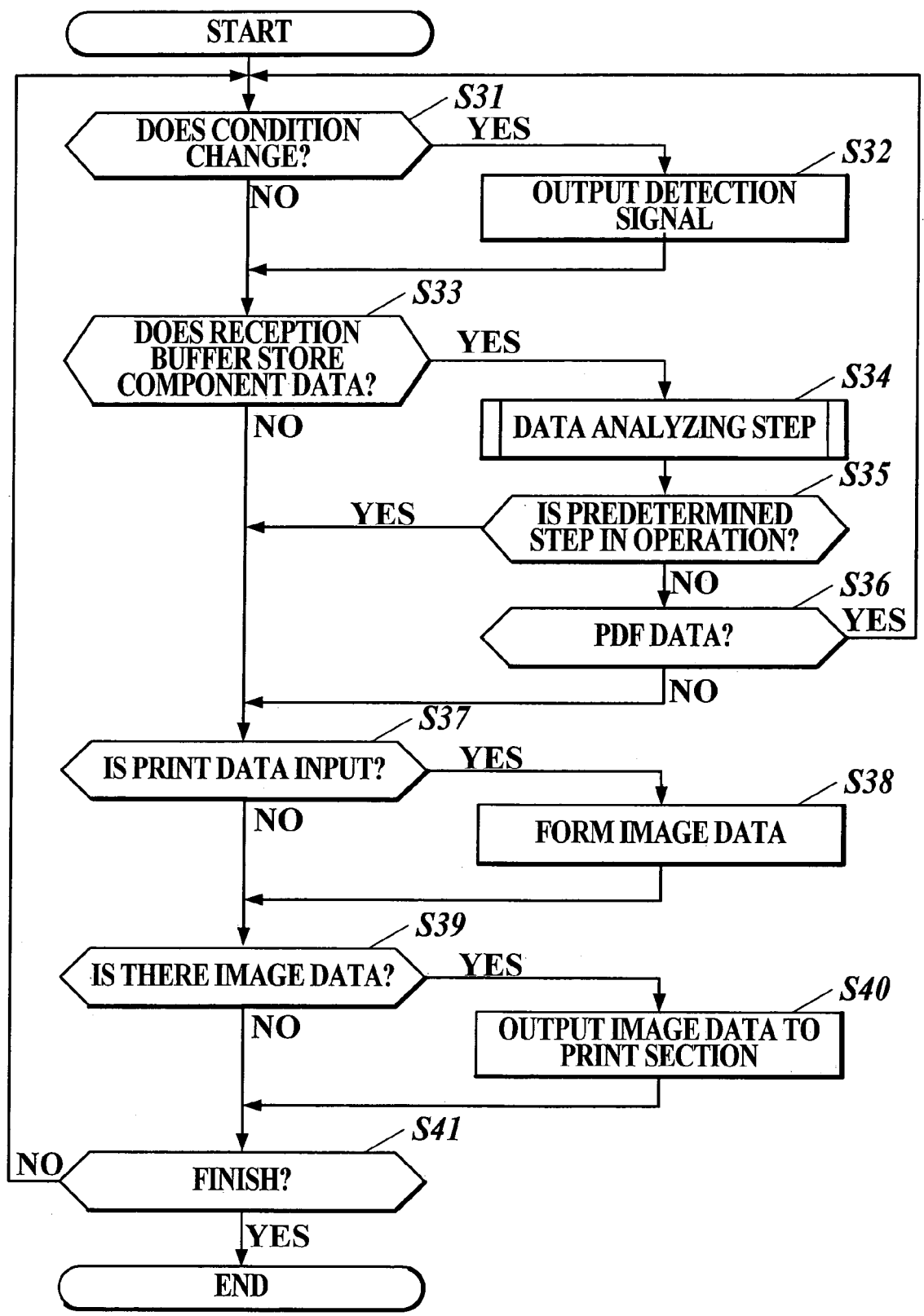
FIG. 5 is a flowchart showing an image forming process of the second embodiment.

FIG. 5 is a flowchart showing a series of steps in the image forming process of the printer 20 of the present embodiment. Each step shown in FIG. 5 shows a process executed in round-robin fashion under control of the controlling section 201. In FIG. 5, operations of steps S31 to S34 and S36 to S41 are similar with that of steps S11 to S14 and S15 to S20 of the printer 20 of the above-described first embodiment respectively. Thus, descriptions thereof are omitted.

In the present process, after print data is analyzed in step S34, the controlling section 201 judges whether a predetermined process is in operation or not, based on a condition of each section of the printer 20, which is input in step S32. When it is judged that the predetermined process is in operation (step S35; Yes), the process shifts to step S37. On the other hand, when it is judged in step S35 that the predetermined process is not in operation (step S35; No), the process shifts to step S36.

The predetermined process of step S35 can be set optionally. For example, when a conversion process is performed by an image converting section 209 or a print data sending process is performed by a print data sending section, the process shifts to step S37. By doing so, in the present embodiment, data reception of PDF data is performed preferentially under a predetermined condition. If the data reception of PDF data takes top priority, for example, other print job accepted previously may be interrupted. In the present embodiment, it is possible to give priority to a step regarding the other job accepted previously.

As described above, the printer 20 of the second embodiment is successful in performing a step regarding reception of PDF data in preference to the other steps, according to a condition of the printer 20. By doing so, it becomes possible to perform a step according to the operation condition of the printer 20, since the step regarding reception of PDF data is not performed preferentially when the predetermined step is in operation.

Detailed constitution and operation of the image forming apparatus in the above-described present embodiment may be modified optionally within a scope of the present invention.

The present embodiment describes a case where PDF data composed in a PDF format is received as the structured document data. However, the present invention is not limited thereto, and may apply to a structured document data composed in the other format.

Further, the present embodiment describes a case where PDF data is sent from the personal computer to the printer based on an operation on the personal computer. However, the present invention is not limited thereto. The present invention may apply to a case where PDF data is acquired from a storage storing PDF data by designating the storage where the PDF data to be printed is stored, and is printed by the printer.

Further, the present embodiment describes a case where PDF data is subjected to the image forming process of the present invention. However, the present invention is not limited thereto. In addition to PDF data, any document file may be subjected to the process of the present invention, when embodiments to describe a part of all of content included in a certain page of the document may be arranged optionally in the document independently from a sequence thereof displayed in the document.

Further, the present embodiment exemplifies the personal computer as an image processor and the printer as an image forming apparatus. However, the present invention is not limited thereto. As for the image processor, for example a computer such as a workstation and server may be given instead of the personal computer, As for the image forming apparatus, a MFP (multi function peripheral) having a printing function of a digital copier, facsimile and the like, and a display connected to a personal computer or the like such as a CRT display, LCD display and projector may be given.

The image forming apparatus and image forming method of the invention may be achieved with a hardware circuit specific for executing the above-described process, or a CPU which executes programs describing the above-described each process. When achieved with the latter case, the above-described program to operate the image forming apparatus may be provided in a form of a computer-readable recording medium such as a FLOPPY® DISK, CD-ROM or online through network such as Internet. In this case, the program recorded in the computer-readable recording medium is transferred to a ROM, bard disk or the like and recorded therein. Further, this program may be provided as independent application software or may be incorporated in software of the image forming apparatus as one of functions of the image forming apparatus.

While the preferred embodiments of the present invention have been described using specific terms, such description is for illustrative purposes only, and it is to be understood that changes and variations may be made without departing from the spirit or scope of the appended claims.

What is claimed:

1. An image forming apparatus comprising:
    a receiving section which receives a print data;
    a storage which stores the received print data;
    a print data judging section which judges whether the received print data is a structured document data or not;
    an image converting section which converts the stored print data to image data;
    a printing section which prints the image data to a predetermined recording medium; and
    a controlling section which selectively executes a first operation in the case where the print data is judged as non-structured document data or a second operation in the case where the print data is judged as structured document data;
    wherein in the first operation, whether a data receiving process for receiving the print data is executable or not is judged, whether an image data forming process for converting the stored print data to the image data is executable or not is judged, and whether an output process for outputting the image data to the printing section is executable or not is judged, and each executable process is executed; and
    in the second operation, the data receiving process is executed without judging whether each of the image data forming process and the output process is executable or not until the whole of the structured document data is received, and after the whole of the structured document data is received, it is judged whether the image data forming process and the output process are executable or not.

2. The image forming apparatus of claim 1, further comprising a condition detecting section which detects a condition of the image forming apparatus, wherein the controlling section performs the data receiving process based on a detection results detected by the condition detecting section.

3. The image forming apparatus of claim 1, wherein the print data judging section judges whether the print data is structured document data or not, based on information included in a header part of the print data.

4. The image forming apparatus of claim 1, wherein document structure information designating data structure to be printed is included in an end part of the structured document data.

5. The image forming apparatus of claim 1, wherein the structured document data is composed in a format of PDF format.

6. An image forming method comprising:
receiving a print data through a receiving section;
storing the received print data;
judging whether the received print data is structured document data or not;
converting the stored print data to image data;
printing the image data to a predetermined recording medium; and
executing a first operation in the case where the print data is judged as non-structured document data or a second operation in the case where the print data is judged as structured document data;
wherein in the first operation, whether a data receiving process for receiving the print data is executable or not is judged, whether an image data forming process for converting the stored print data to the image data is executable or not is judged, and whether an output process for outputting the image data to a printing section is executable or not is judged, and each executable process is executed; and
in the second operation, the data receiving process is executed without judging whether each of the image data forming process and the output process is executable or not until the whole of the structured document data is received, and after the whole of the structured document data is received, it is judged whether the image data forming process and the output process are executable or not.

7. A computer-readable recording medium storing a computer executable program that, when executed, causes a computer to:
receive a print data;
store the received print data;
judge whether the received print data is structured document data or not;
convert the stored print data to image data;
print the image data to a predetermined recording medium; and
execute a first operation in the case where the print data is judged as non-structured document data or a second operation in the case where the print data is judged as structured document data;
wherein in the first operation, whether a data receiving process for receiving the print data is executable or not is judged, whether an image data forming process for converting the stored print data to the image data is executable or not is judged, and whether an output process for outputting the image data to a printing section is executable or not is judged, and each executable process is executed; and
in the second operation, the data receiving process is executed without judging whether each of the image data forming process and the output process is executable or not until the whole of the structured document data is received, and after the whole of the structured document data is received, it is judged whether the image data forming process and the output process are executable or not.

* * * * *